United States Patent
Hatton et al.

(10) Patent No.: US 8,683,443 B2
(45) Date of Patent: Mar. 25, 2014

(54) STREAMLINED METHODOLOGY FOR RESOLVING SOFTWARE INTEGRATION CONFLICTS

(75) Inventors: James Hatton, Odessa, FL (US); Analia Mastrogiovanni, Tampa, FL (US); Alexis Williams, Odessa, FL (US)

(73) Assignee: salesforce.com, inc., San Francisco, CA (US)

( * ) Notice: Subject to any disclaimer, the term of this patent is extended or adjusted under 35 U.S.C. 154(b) by 119 days.

(21) Appl. No.: 13/355,417

(22) Filed: Jan. 20, 2012

(65) Prior Publication Data

US 2013/0055233 A1 Feb. 28, 2013

Related U.S. Application Data

(60) Provisional application No. 61/527,227, filed on Aug. 25, 2011.

(51) Int. Cl.
*G06F 9/44* (2006.01)

(52) U.S. Cl.
USPC .......................................... 717/124

(58) Field of Classification Search
USPC ................................. 717/100–150
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |

(Continued)

OTHER PUBLICATIONS

Perforce Software, Perforce 2011.1 P4 User's Guide, Oct. 2011, Copyright 2005-2011; Retrieved form the internet at URL: http://www.perforce.com/documentation/perforce_user_manuals.

*Primary Examiner* — Chuck Kendall

(74) *Attorney, Agent, or Firm* — Ingrassia Fisher & Lorenz, P.C.

(57) ABSTRACT

A computer-based system to integrate code changes for a software application is provided. The system detects when a requested code change for a branch of the software application conflicts with another code change, and generates a blocked change notification corresponding to the detected conflict. The blocked change notification includes a blocked change identifier corresponding to the requested code change. The notification is delivered to a user device, which responds with a conflict resolution response that includes at least one code change file associated with the requested code change, along with an integration annotation that conveys the blocked change identifier and a branch name identifier that identifies the branch of the software application. The system acts upon the integration annotation to integrate the at least one code change file into the branch of the software application.

20 Claims, 6 Drawing Sheets

(56) References Cited

U.S. PATENT DOCUMENTS

| | | |
|---|---|---|
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,620,655 B2 | 11/2009 | Larsson et al. |
| 7,698,160 B2 | 4/2010 | Beaven et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0293046 A1* | 11/2009 | Cheriton ............... 717/136 |

* cited by examiner

| | DETAILS |
|---|---|
| Name | gus2.0 patch main |
| Integration | //adm/gus/gus2.0/patch/...--> //adm/gus/main/... |
| Status | BLOCKED |
| Message | there were conflicting changes! |
| Branch Name | gus2.0_patch_main  ←420 |
| Attempted Changelist | 1486953  ←422 |
| Originating Changelist | |
| Status Since | 27-OCT-10 |
| Integration Command | P4 integrate -b gus2.0_patch_main //...@1486953,@1486953 |

*FIG. 4*

STREAMLINED METHODOLOGY FOR RESOLVING SOFTWARE INTEGRATION CONFLICTS

CROSS-REFERENCE TO RELATED APPLICATION(S)

This application claims the benefit of U.S. provisional patent application Ser. No. 61/527,227, filed Aug. 25, 2011.

TECHNICAL FIELD

Embodiments of the subject matter described herein relate generally to software development tools and methodologies. More particularly, embodiments of the subject matter relate to a methodology for handling and resolving conflicts that arise when attempting to integrate changes to a branch of code.

BACKGROUND

Version control systems and methodologies are used to regulate, monitor, and execute changes to the code of software applications. As one example, a version control system can regulate the implementation of updates or patches to a software application to ensure that conflicting code changes (which may be written by different developers) are not integrated into the software application. As another example, a version control system can be utilized to ensure that bug fixes in development for a currently deployed version of a software application are included in the next version of the software application, which may also be under development. Version control systems are particularly useful with branched software applications that accommodate changes and fixes to one branch of code while another branch of the code remains live. Such functionality is important for software applications that are designed for continuous operation and little to no downtime, such as hosted cloud-based applications, enterprise software, web-based applications, or the like.

A number of software version control systems are commercially available. For example, the following version control products can be used to regulate code changes to branched software: the PERFORCE version control application, which is available from Perforce Software, Inc.; the ACCUREV software configuration management product, which is available from AccuRev, Inc.; and the BITKEEPER software configuration management product, which is available from BitMover, Inc. Although these products detect and handle code change conflicts, in certain situations, it can be cumbersome or time consuming for a user to resolve a detected code change conflict using these existing tools. For example, a conflict resolution procedure may require the user to search for and upload files, manually enter data in different fields, manipulate a plurality of screens, or otherwise perform a number of "clicks" or steps associated with the operation of the version control system.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 4 is a diagram that depicts the content of an exemplary blocked change notification;

DETAILED DESCRIPTION

Figure 1:
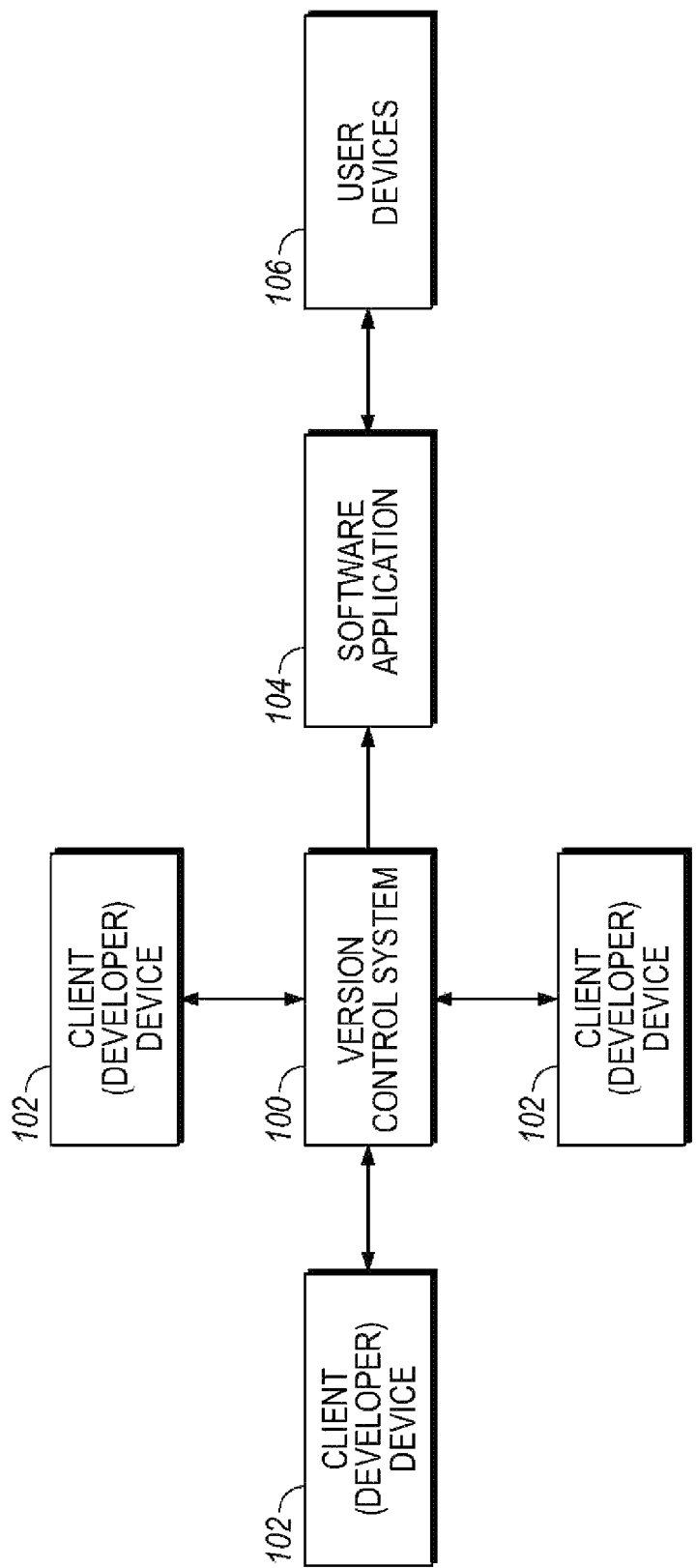
FIG. 1 is a schematic representation of an exemplary environment in which a version control system is deployed.

The exemplary embodiments presented here relate to software development tools and methodologies that facilitate the integration of code changes (e.g., bug fixes, updates, patches, or enhancements) to a software application. The described subject matter is suitable for use with a version control system that supports software applications coded in branches that accommodate development on one code branch while other code branches remain deployed.

Various methods and systems for submitting annotations to integration fixes are presented here. One of the complexities of developing code is keeping track of what changes have been made over time. Versioning tools allow developers to keep track of the various revisions that occur to code over time, however, those various revisions do not necessarily contain information about what was fixed in each revision. For example, a new version of code may be developed to fix multiple bugs, but won't necessarily specify what aspect of new code fixes which bug.

In accordance with one conventional development environment, developers perform the following steps to update and integrate new code in a branch of existing code:

(1) the developer uses a tool, such as the PERFORCE revision control software product provided by Perforce Software, Inc., to integrate changes to a branch of code;

(2) the developer accesses the original bug, updates its status to "Integrate", changes the scheduled build to target branches of the current build number, and gets status permission to open and release the code once it has been checked in;

(3) the developer checks in the changes to the destination branch after resolving or fixing whatever issue it was that auto-integration failed; and (4) the developer returns to the original bug, changes the status back to the original setting, and changes the scheduled build back to release that which was originally checked in.

The process outlined above requires the developer to pay particularly close attention to what is being checked in, and it includes a number of steps that require user involvement. To improve this methodology, the exemplary embodiments described below have been developed to simplify the user workflow and integration process. For example, in an exemplary development environment, an implementation may include the following:

(1) integrate a change number to the next branch; and (2) check the change into its destination using a defined annotation, tag, or nomenclature (for example: @integ <src-_change#> <branchspec_name>@).

Integration issues can be handled by using the new "@integ" tag to quickly and easily submit the fix. This new tag saves time and user "clicks" when integrating between branches. Consequently, the methodology presented here can be implemented to reduce the overhead associated with integrating changes between branches. The original work record used to check in against the version control system can be used again to integrate changes into another branch. This works for user stories as well as bugs. The following caveats apply when checking into the version control system:

(1) Bug—the developer must still be the assigned-to for these work records;

(2) User Story—the developer may either belong to the scrum team assigned to the work or be the person assigned to the work; and (3) All of the files contained in the change list being referenced must be included in the current change list being submitted.

A reduction in the number of clicks to integrate code into different branches has been realized by utilizing this annotation because a developer no longer needs to update the following values when integrating using this annotation: scheduled build; status; and version control system status.

In accordance with one exemplary embodiment, a blocked change list notification is generated (containing the files originally submitted, the number of the change list, and the branch name). These three facets of the notification are to be noted. The change list description includes the change list number from the email notification as well as the branch name, preferably in the following three-line format:

Description of the change
URL work value
@integ CL# branch_name@

In certain embodiments, the change list only contains numeric characters. The change list description can be populated by copying and pasting the branch name exactly as it appears in the email notification. One literal (and non-limiting) example is reproduced below for illustrative purposes:

Resolving blocked integration from freeze to patch in GUS3.02 code line
https://gus.soma.salesforce.com/a0790000000CbXj
@integ 1478077 gus2.0_freeze_patch@

The system is designed to verify the input as a double check. In this regard, the system may generate an error message if a specified annotation format is not utilized. One example of such an error message is reproduced here:

ERROR: Improperly formatted @integ@ annotation. Please review your change list description before submitting your change list again.

Moreover, the change list must contain at least the same files listed in the blocked integration. Additional files may be included (other than those originally listed), but failure to include at least the original set of files will result in an error message being returned. One example of such an error message reads as follows:

ERROR: Not all files properly integrated from previous change. You may need to have the branchspec updated, or please use the proper integrate command: p4 integrate-b: core__164_main// . . . @1155723,@1155723'.

A valid URL also needs to be included with the change list description. This URL is needed to create a change list and release stamp if automated release stamping has been set up in the branch that is being integrated into.

Referring now to the drawings, FIG. 1 is a schematic representation of an exemplary environment in which a version control system 100 is deployed. The version control system 100 is deployed as a computer-based system that could be implemented and realized using one or more hardware components, in accordance with established software deployment techniques and technologies. For example, the version control system 100 could be maintained on one or more servers in a centralized manner to support a plurality of users. As another example, separate instantiations of the version control system 100 could be locally installed on a plurality of client devices.

The version control system 100 may leverage existing and commercially available version control or software configuration management products. In this regard, an existing version control product (such as the PERFORCE versioning control application) could be extended, enhanced, or otherwise modified to accommodate the features, techniques, and methodologies described in more detail below with reference to FIGS. 3-6. Consequently, the fundamental operating features and functions of the version control system 100 (which are well known) will not be described in detail here.

The illustrated embodiment of the version control system 100 supports a plurality of client devices 102. Although not explicitly depicted in FIG. 1, the client devices 102 may be operatively coupled to the version control system 100 using a suitable data communication network that might utilize any number of network protocols and technologies (e.g., a local area network, a wireless network, the Internet, a cellular telecommunication network). For this example, the client devices 102 can be used by software developers to write and submit code to the version control system 100 for inclusion in a software application 104. Although only one software application 104 is shown in FIG. 1, the version control system 100 can support and manage any number of different software applications as needed. The software application 104 can be accessed or otherwise used by one or more user devices 106. In certain embodiments, the software application 104 is a hosted application (e.g., a cloud-based software product) that remotely cooperates with the user devices 106 via a suitable data communication network (e.g., a local area network, a wireless network, the Internet, a cellular telecommunication network, or the like). In some preferred embodiments, the software application 104 is a cloud-based product that is maintained and provided by a suitably configured multi-tenant data processing system that supports a plurality of different tenants.

Although not always required, this description assumes that the software application 104 has multiple code branches that allow developers to work on bug fixes, patches, updates, or enhancements in one branch of the code (e.g., in a "patch" branch), while the software application 104 remains live and operational using another branch of the code (e.g., a "main" branch). In this regard, the version control system 100 can be used to integrate or "check-in" code changes into the main branch of the software application 104 with little to no disruption in service. The manner in which branched code is written, maintained, and integrated, and other conventional aspects of branched code will not be described in detail here.

Figure 2:
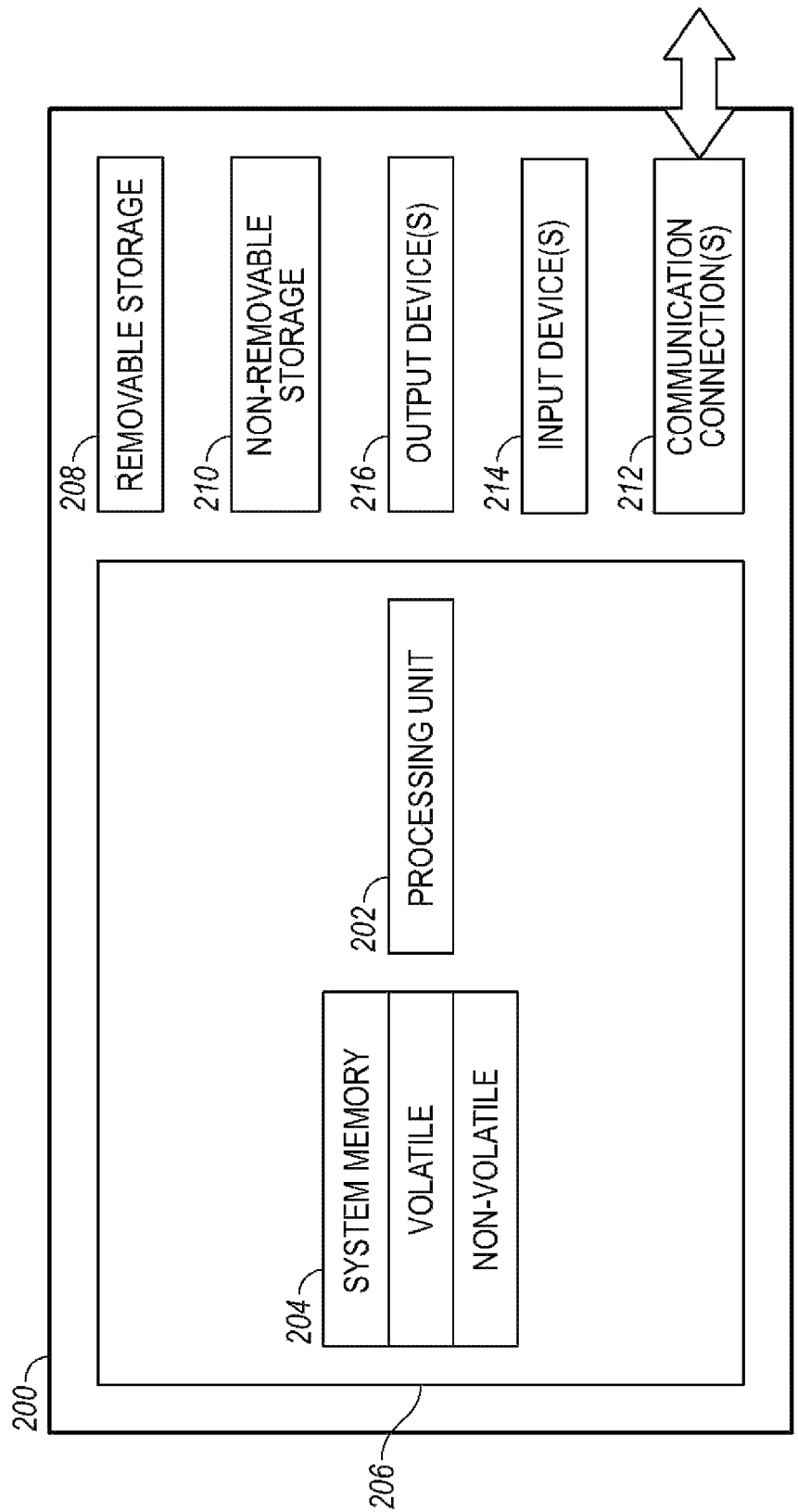
FIG. 2 is a simplified schematic representation of an exemplary computer-based system for implementing an exemplary embodiment of a version control system.

FIG. 2 is a simplified schematic representation of an exemplary computer-based system 200 for implementing an exemplary embodiment of a version control system. Indeed, the computer-based system 200 described here could be used to implement the version control system 100 shown in FIG. 1. Moreover, a client device 102 or a user device 106 (see FIG. 1) could be configured in accordance with the computer-based system 200.

The system 200 is only one example of a suitable operating environment and is not intended to suggest any limitation as to the scope of use or functionality of the inventive subject matter presented here. Other well known computing systems, environments, and/or configurations that may be suitable for use with the embodiments described here include, but are not limited to, personal computers, server computers, hand-held or laptop devices, multiprocessor systems, microprocessor-based systems, network PCs, minicomputers, mainframe computers, distributed computing environments that include any of the above systems or devices, and the like.

The system 200 and certain aspects of the exemplary version control systems may be described in the general context of computer-executable instructions, such as program modules, executed by one or more computers or other devices. Generally, program modules include routines, programs, objects, components, data structures, and/or other elements that perform particular tasks or implement particular abstract data types. Typically, the functionality of the program modules may be combined or distributed as desired in various embodiments.

The system 200 typically includes at least some form of computer readable media. Computer readable media can be any available media that can be accessed by the system 200 and/or by applications executed by the system 200. By way of example, and not limitation, computer readable media may comprise tangible computer storage media, non-transitory computer storage media, and communication media. Computer storage media includes volatile, nonvolatile, removable, and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by the computer-based system 200. Communication media typically embodies computer readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

Referring again to FIG. 2, in its most basic configuration, the system 200 typically includes at least one processing unit 202 and a suitable amount of memory 204. Depending on the exact configuration and type of platform used for the system 200, the memory 204 may be volatile (such as RAM), non-volatile (such as ROM, flash memory, etc.) or some combination of the two. This most basic configuration is identified in FIG. 2 by reference number 206. Additionally, the system 200 may also have additional features/functionality. For example, the system 200 may also include additional storage (removable and/or non-removable) including, but not limited to, magnetic or optical disks or tape. Such additional storage is represented in FIG. 2 by the removable storage 208 and the non-removable storage 210. The memory 104, removable storage 108, and non-removable storage 110 are all examples of computer storage media as defined above.

The computer-based system 200 may also contain communications connection(s) 212 that allow the system to communicate with other devices. For example, the communications connection(s) could be used to establish data communication between the system 200 and devices or terminals operated by software developers or other end users. The communications connection(s) 212 may be associated with the handling of communication media as defined above.

The system 200 may also include or communicate with various input device(s) 214 such as a keyboard, mouse or other pointing device, pen, voice input device, touch input device, etc. Although the exemplary embodiment described herein utilizes a mouse device, certain embodiments can be equivalently configured to support a trackball device, a joystick device, a touchpad device, or any type of pointing device. The system 200 may also include or communicate with various output device(s) 216 such as a display, speakers, printer, or the like. All of these devices are well known and need not be discussed at length here.

Figure 3:
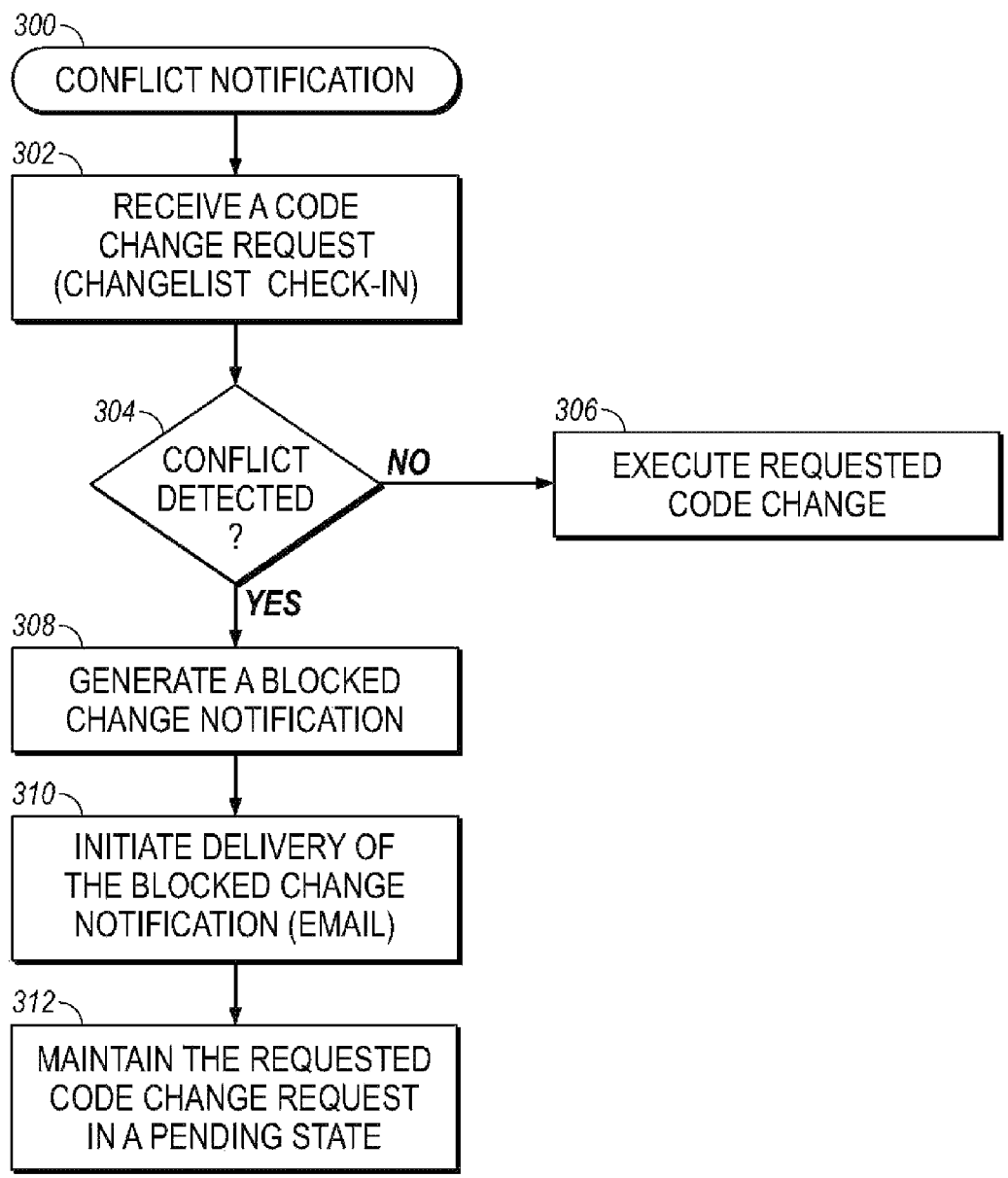
FIG. 3 is a flow chart that illustrates an exemplary embodiment of a conflict notification process.

A version control system as described here can be realized as a computer-based system that is suitably configured to integrate code changes associated with a software application having multiple code branches. As mentioned above with reference to FIG. 2, an exemplary embodiment of the version control system includes or cooperates with a processor and a memory element to store executable instructions that, when executed by the processor, cause the version control system to perform the various operations, functions, and processes described in more detail herein. In this regard, FIG. 3 is a flow chart that illustrates an exemplary embodiment of a conflict notification process 300, which may be performed by the version control system. The various tasks performed in connection with a process described herein may be performed by software, hardware, firmware, or any combination thereof. In practice, portions of a described process may be performed by different elements of the described system. It should be appreciated that an illustrated process may include any number of additional or alternative tasks, the tasks shown in a figure need not be performed in the illustrated order, and a described process may be incorporated into a more comprehensive procedure or process having additional functionality not described in detail herein. Moreover, one or more of the tasks shown in a figure could be omitted from an embodiment of the described process as long as the intended overall functionality remains intact.

For this particular example, the process 300 receives a code change request (e.g., a changelist check-in) that is intended to integrate a piece of code into a designated software application (task 302). In practice, the code change request can be generated, issued, or submitted by a user of the version control system, typically a developer of the target software application. Although not particularly important for purposes of this description, the code change request may be associated with a bug fix, a patch, an enhancement, an update, a new release, a new version, or the like. Before executing the requested code change, the version control system checks whether the requested code change conflicts with another code change request (query task 304). For example, there might be two or more developers working on a multiple-branch software application. The process 300 can detect when a requested code change for a branch of the software application conflicts with another code change (e.g., a previously submitted code change or a concurrently pending code change request) for the same branch.

If no conflict is detected (the "No" branch of query task 304), then the process 300 can execute the requested code change and integrate the associated code into the software application (task 306). If, however, the process 300 detects that the requested code change conflicts with another code change, (the "Yes" branch of query task 304), then the process 300 continues in an attempt to resolve the detected conflict. This particular example continues by generating a blocked change notification, which corresponds to the detected conflict (task 308), and by initiating delivery of the blocked change notification to a user device (task 310). In this regard, the blocked change notification is intended to inform the originator of the blocked code change request that a conflict has prevented the integration of the desired piece of code. Accordingly, the blocked change notification is preferably issued to one or more user devices owned by, monitored by, registered to, or otherwise assigned to the originator of the code change request. In certain embodiments, the blocked change notification is generated in the form of an email, a private message, or a pop-up window designed to be viewed by the originator.

The detected conflict causes the version control system to maintain the requested code change request in a pending or held state (task 312). In other words, the process 300 does not execute the code change request, and the desired code change is not actually integrated into the software at this time. The process 300 may hold the requested code change for as long as necessary, e.g., until the conflict is resolved.

The blocked change notification may include a description, one or more active links, one or more files, status data, and/or other information related to the detected conflict. The information contained in the blocked change notification enables the user to review the situation and take appropriate action if so desired. In this regard, FIG. 4 is a diagram that depicts the content of an exemplary blocked change notification 400. As mentioned above, the blocked change notification 400 may be provided in the form of an email, an HTML document, an instant message, a pop-up, or the like. It should be understood that the specific content of a blocked change notification may vary from that depicted in FIG. 4. Moreover, the amount of information, the number of fields, and other parameters may vary from one embodiment to another.

The illustrated blocked change notification 400 includes the following fields, without limitation: a Name field 402; an Integration field 404; a Status field 406; a Message field 408; a Branch Name field 410; an Attempted Changelist field 412; an Originating Changelist field 414; a Status Since field 416; and an Integration Command field 418. The Name field 402 includes the name or other identifier of the code change that is the subject of the blocked change notification 400 (i.e., the name of the blocked code change request). The Integration field 404 includes the path to the directory holding the code on the server that is used to deploy the version control system. The Status field 406 indicates the current status of the identified code change. Notably, the Status field 406 in any blocked change notification will indicate a "Blocked" status, which is consistent with the detected code change conflict. The Message field 408 includes a brief message, explanation, or note intended for the recipient of the blocked change notification 400. For this particular example, the Message field 408 conveys the following message: "There were conflicting changes!"—this message is consistent with the detected code change conflict.

The Branch Name field 410 includes the name or other identifier 420 of the code branch that is the target of the intended integration operation. In practice, the Branch Name field 410 contains a text string, which may have a combination of letters, numbers, and characters. The illustrated example indicates that the blocked code change is intended for integration into the code branch named "gus2.0_patch main" (as specified in the Branch Name field 410).

The Attempted Changelist field 412 includes a blocked change identifier 422 that corresponds to the originally requested code change. The blocked change identifier 422 is formatted as a string (e.g., a series of numbers) that distinguishes the requested code change from other code changes that have been implemented or are pending for the software application. For this particular example, the blocked change identifier 422 is the number "1486953" (as listed in the Attempted Changelist field 412).

The Originating Changelist field 414 may be used in some scenarios to identify an originating changelist number that is somehow associated with the blocked change notification. The Status Since field 416 includes a date that corresponds to the current status of the code change as indicated in the Status field 406. The Integration Command field 418 includes the starting and ending change list number. In this regard, when integrating a range of change lists, the starting number will be lower than the ending number. For the illustrated example, the numbers are the same (two instances of the number 1486953), which indicates that this integration references a single change list.

In certain embodiments, the blocked change notification may also include (e.g., as an attachment) a copy or an instantiation of at least one code change file that is associated with the requested code change. In other words, the blocked change notification could "return" the code change file(s) that were blocked due to the detected conflict. Thus, the user will be able to quickly and easily determine which code change files were blocked by the version control system. Alternatively (or additionally), the blocked change notification may provide a link to the blocked files, provide the names of the blocked files, provide the locations of the blocked files, or the like.

As mentioned above, the version control system is suitably configured to resolve detected code change conflicts in response to certain instructions, commands, or requests issued by a user. The exemplary embodiment presented here employs a integration annotation (having a designated format/syntax) that results in a quick and efficient resolution of a code change conflict. From the perspective of the developer, the integration annotation represents a simple "shortcut" mechanism that facilitates the checking in of a desired code change while resolving a conflict detected by the version control system.

Figure 5:
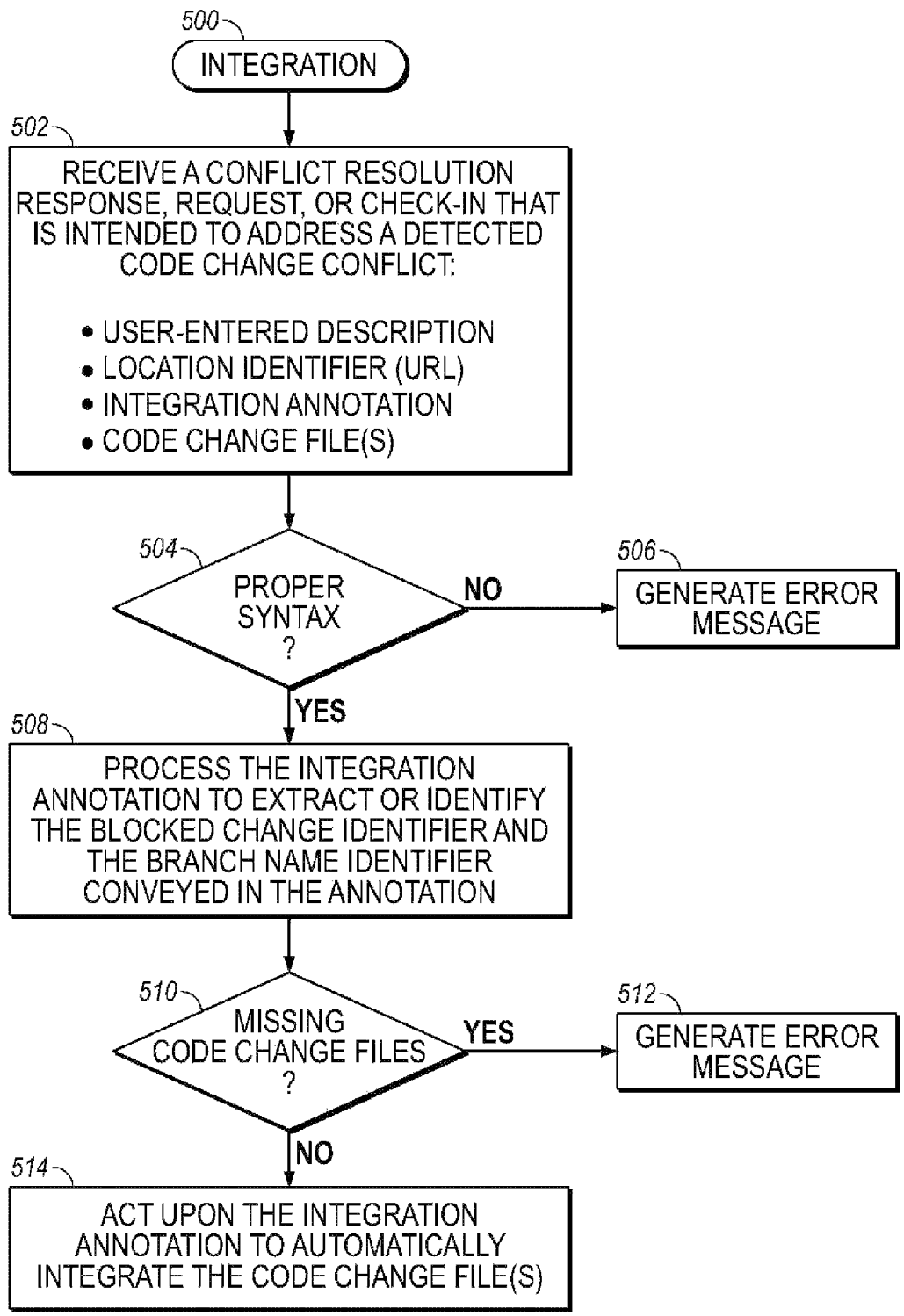
FIG. 5 is a flow chart that illustrates an exemplary embodiment of an integration process.

FIG. 5 is a flow chart that illustrates an exemplary embodiment of an integration process 500, which may be performed by a version control system configured in the manner described herein. The process 500 may be performed in cooperation with the conflict notification process 300 if so desired. The illustrated embodiment of the process 500 begins by receiving a conflict resolution response for a detected conflict (task 502). In a typical scenario, the conflict resolution response is received after the system generates and issues a blocked change notification (as described above with reference to FIG. 3 and FIG. 4). Accordingly, conflict resolution responses are intended to address blocked change conditions, during which a requested code change for a software application conflicts with another code change for the software application.

As used here, a conflict resolution "response" may be associated with one or more requests, commands, instructions, code check-in operations, electronic form submissions, web page interactions, or the like. For example, a conflict resolution response could be generated by a user device (such as a desktop or laptop computer) in response to user interaction with a software application that embodies the version control system. In certain embodiments, the version control system provides a suitably formatted and arranged GUI, window, or web page that allows the user to enter information, attach files, and otherwise create and submit conflict resolution responses.

Figure 6:
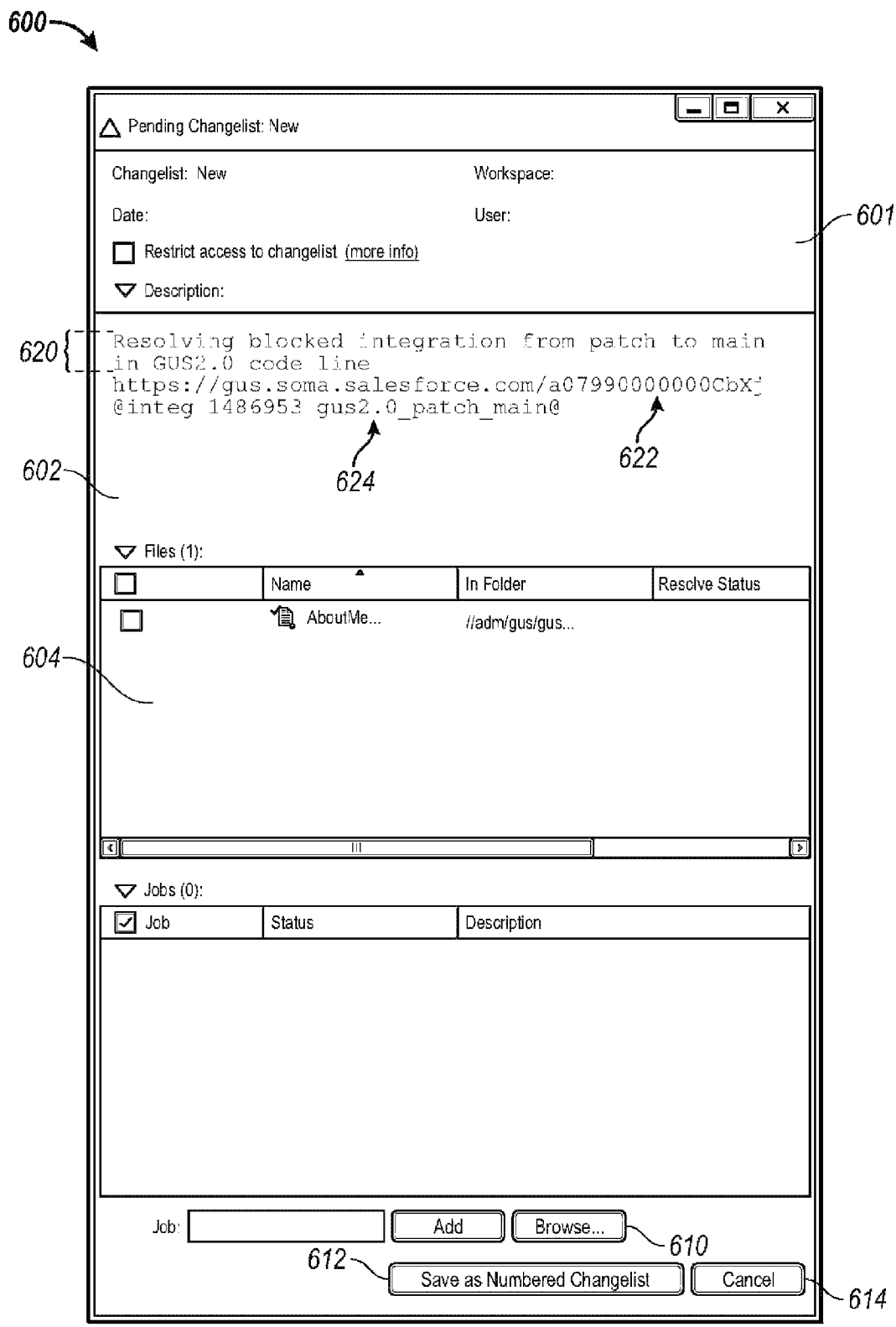
FIG. 6 is a diagram that depicts an exemplary graphical user interface (GUI) that accommodates the creation and submission of a conflict resolution response.

FIG. 6 is a diagram that depicts an exemplary GUI (identified by reference number 600) that accommodates the creation and submission of a conflict resolution response. The GUI 600 may be provided as a feature of a version control application, incorporated into an email, an HTML document, a pop-up, or the like. It should be understood that the specific content depicted in FIG. 6 is merely exemplary, and that the amount of information, the number of fields, the arrangement of elements, and other parameters may vary from one embodiment to another. The illustrated GUI 600 includes the following components, without limitation: a Details field 601; a Description field 602; a File field 604; a Browse button 610; a Save As Numbered Changelist button 612; and a Cancel button 614.

The Details field 601 includes one or more data entry boxes to accommodate user-entered information that identifies the conflict resolution response (which, for this particular example, is realized as a changelist for purposes of handling and processing by the version control system). The Details field 601 may include data entry boxes corresponding to the following information, without limitation: a changelist identifier; a workspace identifier; a date identifier; and a user identifier.

The Description field 602 accommodates user-entered information that enables the version control system to resolve the detected code change conflict and to perform the desired integration operation. In certain embodiments, the Description field 602 is implemented as a text entry box that supports user-entered text, cut-and-pasted text, copy-and-pasted text, etc. The required format, arrangement, and syntax of the information entered in the Description field 602 may vary from one embodiment to another. Moreover, the specific content included in the Description field 602 will vary from one conflict resolution response to another. For the exemplary embodiment presented here, the Description field 602 includes at least three pieces of information to be submitted to the version control system: (1) a user-entered description 620 of an intended integration operation; (2) a location identifier 622 that identifies where, in the branch of the software application, at least one code change file is to be integrated; and (3) an integration annotation 624.

In practice, the user may insert any desired text into the user-entered description 620. Although the user is free to provide any desired input, in a typical scenario, the user-entered description 620 serves as a brief summary or explanation of the conflict resolution response, the intended goal, or the like. For this particular example, the location identifier 622 includes or is realized as a uniform resource locator (URL) that points to a particular integration location in the software product. The URL may be entered by the user, or it may be copied/cut and pasted from the blocked change notification.

The integration annotation 624 has a designated format and syntax that enables the process 500 to quickly and easily identify the integration annotation 624 within the Description field 602, analyze the integration annotation 624, extract or otherwise identify certain information conveyed in the integration annotation 624, and act upon the integration annotation 624 to integrate at least one code change file into the branch of the software application (at the location corresponding to the location identifier 622). Although any designated format and syntax could be employed, the exemplary embodiment presented here utilizes the following format and syntax for integration annotations 624:

> @integ <blocked change identifier> <branch name identifier>@

Notably, the integration annotation 624 begins and ends with a special character, such as the "@" character, the text string "integ" immediately follows the leading "@" character, and the trailing "@" character immediately follows the branch name identifier. The blocked change identifier is a character string that corresponds to and identifies the blocked code change. Although the blocked change identifier can be formatted in any number of different ways, the exemplary embodiment utilizes a seven-digit string of numbers for each blocked change identifier. In practice, the blocked change identifier contained in the integration annotation 624 is identical to the blocked change identifier conveyed in the associated blocked change notification (see the blocked change identifier 422 depicted in FIG. 4). The branch name identifier is a character string that corresponds to and identifies the branch of the software application that is the subject of the conflict resolution response. In other words, the branch name identifier identifies the target branch for the intended integration operation. Although the branch name identifier can be formatted in any number of different ways, the exemplary embodiment utilizes a string of text characters for each branch name identifier. In practice, the branch name identifier contained in the integration annotation 624 is identical to the branch name conveyed in the associated blocked change notification (see the branch name identifier 420 depicted in FIG. 4). For the illustrated embodiment, the integration annotation 624 is formatted such that at least one space (preferably, only one space) appears between the "integ" text and the blocked change identifier, and such that at least one space (preferably, only one space) appears between the blocked change identifier and the branch name identifier. Moreover, the blocked change identifier appears before the branch name identifier, as shown in FIG. 6.

It should be appreciated that the version control system can "parse" or otherwise identify the different types of content conveyed in the Description field 602 by recognizing certain text, characters, or the like. For example, the location identifier 622 can be readily identified (in certain implementations) because it begins with "https", and the integration annotation 624 can be identified because it begins and ends with the "@" character. Consequently, the ordering of elements within the Description field 602 need not be predefined or subject to any particular formatting restrictions other than that already described above.

The File field 604 may be any suitably configured GUI control or feature that accommodates the attachment or identification of one or more files (e.g., code change files) to be submitted with or otherwise associated with the conflict resolution response. In certain embodiments, each conflict resolution response must include or identify the same code change file(s) that were the subject of the requested (but blocked) change request. In other words, the system may force the user to "resubmit" the requested code change files in the event of a blocked change. Accordingly, in embodiments that call for file attachments, the initial code change request includes a first instantiation of the code change file(s), and the conflict resolution response includes a second instantiation of the same code change file(s). The File field 604 may also support the attachment or identification of one or more supplemental code change files (which are files other than the requested code change files). Thus, a conflict resolution response can designate additional code change files for integration along with the originally requested (but blocked) code change files.

The GUI 600 may also include one or more GUI buttons that facilitate user interaction with the various features and functions associated with the Details field 601, the Description field 602, and/or the File field 604. For example, the Browse button 610 can be activated to launch a file system browser for purposes of locating a job, a code change file, or the like. The Save As Numbered Changelist button 612 can be activated to generate and save the information as a numbered changelist (i.e., to submit the conflict resolution response). The Cancel button 614 can be activated to cancel the operation without generating a changelist and without submitting a conflict resolution response.

Referring again to FIG. 5, this description assumes that the integration process 500 receives a conflict resolution response that includes a minimum of the following information: a URL that identifies an integration position in the target software application; an integration annotation that conveys a blocked change identifier (e.g., a changelist number) and a branch name identifier; and at least one resubmitted code change file for integration. The exemplary embodiment of the process 500 processes or analyzes the received integration annotation to check it for proper syntax (query task 504). In this regard, the process 500 may check the integration annotation to determine whether or not it is formatted in accordance with the designated rules (see, for example, the above description of the exemplary annotation format). If this checking step determines that the integration annotation has improper syntax (the "No" branch of query task 504), then the process 500 generates an error message that is intended for a user (task 506), and the process 500 does not proceed with the integration operation. The error message may be provided to the user in the form of an email, a text message, a pop-up window, or the like.

The following description assumes that the integration annotation has proper syntax. Accordingly, the process 500 may continue by extracting or identifying the blocked change identifier and the branch name identifier conveyed in the integration annotation (task 508). The process 500 can then use the blocked change identifier to verify whether or not the received conflict resolution response includes all of the code change files that are needed to resolve the blocked change condition (query task 510). In this regard, the version control system could perform a lookup operation using the blocked change identifier conveyed in the integration annotation, identify the code change request that is uniquely associated with the blocked change identifier, identify the blocked code change files that were the subject of the code change request, and compare the list of identified blocked code change files with the code change files received or accessed in connection with the conflict resolution response. If query task 510 determines that the conflict resolution response does not include or identify all of the necessary code change files (the "Yes" branch of query task 510), then the process), then the process 500 generates an error message that is intended for a user (task 512), without performing the integration operation. The error message may be provided to the user in the form of an email, a text message, a pop-up window, or the like.

If query task 510 determines that all of the necessary code change files have been provided (the "No" branch of query task 510), then the process acts upon the integration annotation in an appropriate manner to automatically integrate the code change file(s) into the software application (task 514). Notably, the code change file(s) are integrated into the branch of the software application that corresponds to the branch name identifier conveyed in the received integration annotation. If the conflict resolution response includes one or more supplemental code change files, i.e., code change files in addition to the necessary code change file(s), then task 514 integrates the necessary code change file(s) and the supplemental code change file(s) into the identified branch of the software application. In practice, the integration operation is performed in response to the content of the received integration annotation, namely, the blocked change identifier and the branch name identifier.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals.

What is claimed is:

1. A computer-based system to integrate code changes associated with a software application having multiple code branches, the system comprising a processor and a memory element to store executable instructions that, when executed by the processor, cause the system to:
   detect when a requested code change for a branch of the software application conflicts with another code change for the branch of the software application, resulting in a detected conflict;
   generate a blocked change notification corresponding to the detected conflict, the blocked change notification comprising a blocked change identifier corresponding to the requested code change;
   initiate delivery of the blocked change notification to a user device;
   receive, from the user device, a conflict resolution response for the detected conflict, the conflict resolution response comprising at least one code change file associated with the requested code change, and the conflict resolution response comprising an integration annotation that conveys the blocked change identifier and a branch name identifier that identifies the branch of the software application; and
   act upon the integration annotation to integrate the at least one code change file into the branch of the software application.

2. The system of claim 1, wherein the system integrates the at least one code change file into the branch of the software application in accordance with the blocked change identifier and the branch name identifier conveyed in the integration annotation.

3. The system of claim 1, wherein:
the conflict resolution response comprises a supplemental code change file in addition to the at least one code change file; and
the system acts upon the integration annotation to integrate the at least one code change file and the supplemental code change file into the branch of the software application.

4. The system of claim 1, wherein the blocked change notification comprises the branch name identifier.

5. The system of claim 1, wherein the conflict resolution response comprises a user-entered description of an intended integration operation.

6. The system of claim 1, wherein the conflict resolution response comprises a location identifier that identifies where, in the branch of the software application, the at least one code change file is to be integrated.

7. The system of claim 6, wherein the location identifier comprises a uniform resource locator.

8. The system of claim 1, wherein the executable instructions, when executed by the processor, cause the system to check the integration annotation for proper syntax before acting upon the integration annotation.

9. The system of claim 1, wherein the executable instructions, when executed by the processor, cause the system to verify whether the conflict resolution response includes all code change files needed to resolve the detected conflict before acting upon the integration annotation.

10. A non-transitory computer-readable medium having computer-executable instructions to perform steps comprising:
issuing a blocked change notification when a requested code change for a branch of a software application conflicts with another code change for the branch of the software application;
receiving, in response to the blocked change notification, a conflict resolution response comprising an integration annotation that conveys a blocked change string and a branch name string, the blocked change string identifying the requested code change, and the branch name string identifying the branch of the software application; and
processing the integration annotation to integrate at least one code change file into the branch of the software application, using the blocked change string and the branch name string.

11. The non-transitory computer-readable medium of claim 10, wherein the at least one code change file is associated with the requested code change.

12. The non-transitory computer-readable medium of claim 10, wherein the blocked change notification comprises a first instantiation of the at least one code change file.

13. The non-transitory computer-readable medium of claim 12, wherein the conflict resolution response comprises a second instantiation of the at least one code change file.

14. The non-transitory computer-readable medium of claim 10, wherein the blocked change notification includes the blocked change string.

15. The non-transitory computer-readable medium of claim 10, wherein the blocked change notification includes the branch name string.

16. The non-transitory computer-readable medium of claim 10, wherein the conflict resolution response comprises a location identifier that identifies where, in the branch of the software application, the at least one code change file is to be integrated.

17. The non-transitory computer-readable medium of claim 10, wherein processing the integration annotation comprises checking the integration annotation for proper syntax.

18. A computer-implemented method of integrating code changes associated with a software application, the method comprising:
receiving a conflict resolution request intended to address a blocked change condition during which a requested code change for the software application conflicts with another code change for the software application, the conflict resolution request comprising at least one code change file associated with the requested code change, a location identifier that indicates a location in the software application for integration of the at least one code change file, and an integration annotation;
checking the integration annotation for proper syntax;
when the checking step determines that the integration annotation has proper syntax, extracting a blocked change string and a branch name string from the integration annotation, the blocked change string identifying the requested code change, and the branch name string identifying a branch of the software application; and
integrating the at least one code change file into the branch of the software application, in accordance with the blocked change string, the branch name string, and the location identifier.

19. The method of claim 18, further comprising:
generating an error message when the checking step determines that the integration annotation has improper syntax.

20. The method of claim 18, further comprising:
verifying whether the conflict resolution request includes all code change files needed to resolve the blocked change condition; and
generating an error message when the verifying step determines that the conflict resolution response does not include all code change files needed to resolve the blocked change condition.

* * * * *